United States Patent [19]

Bellanger et al.

[11] Patent Number: 4,487,670

[45] Date of Patent: Dec. 11, 1984

[54] PROCESS FOR TREATING SOLUTIONS CONTAINING TRITIATED WATER

[75] Inventors: Gilbert Bellanger, Selongey; Pierre Giroux, Dijon, both of France

[73] Assignee: Commissariat a l'Energie Atomique, Paris, France

[21] Appl. No.: 447,801

[22] Filed: Dec. 8, 1982

[30] Foreign Application Priority Data

Dec. 9, 1981 [FR] France ................................ 81 23033

[51] Int. Cl.[3] ........................... C25B 1/02; C02F 1/46

[52] U.S. Cl. .................................... 204/129; 204/149; 423/249; 252/630

[58] Field of Search ................ 204/129, 149; 423/249; 252/630

[56] References Cited

U.S. PATENT DOCUMENTS

| | | | |
|---|---|---|---|
| 2,863,526 | 11/1960 | Salmon | 204/129 |
| 3,620,844 | 11/1971 | Wicke | 204/290 R |
| 4,000,048 | 12/1976 | Bianchi | 204/129 |
| 4,190,507 | 2/1980 | Hesky | 204/129 |
| 4,225,402 | 9/1980 | LeRoy | 204/129 |
| 4,331,522 | 5/1982 | Pierini | 204/129 |

*Primary Examiner*—John F. Niebling
*Attorney, Agent, or Firm*—Kerkam, Stowell, Kondracki & Clarke

[57] ABSTRACT

The invention relates to a process and to an apparatus for treating solutions containing tritiated water.

According to this process, an electrolyte such as soda is added to the solution, the solution obtained then undergoes electrolysis in order to release tritium in the gaseous state. Working takes place in an electrolytic cell having a cathode made from a metal which aids the diffusion of tritium, e.g. a Pd-Ag alloy coated with porous palladium black. The cathode forms a separating wall between the solution to be electrolyzed and a tritium reception compartment. The tritium which has diffused through the wall of the cathode is recovered in the compartment.

Use for the recovery of tritium from effluents resulting from the reprocessing of irradiated nuclear fuels.

7 Claims, 1 Drawing Figure

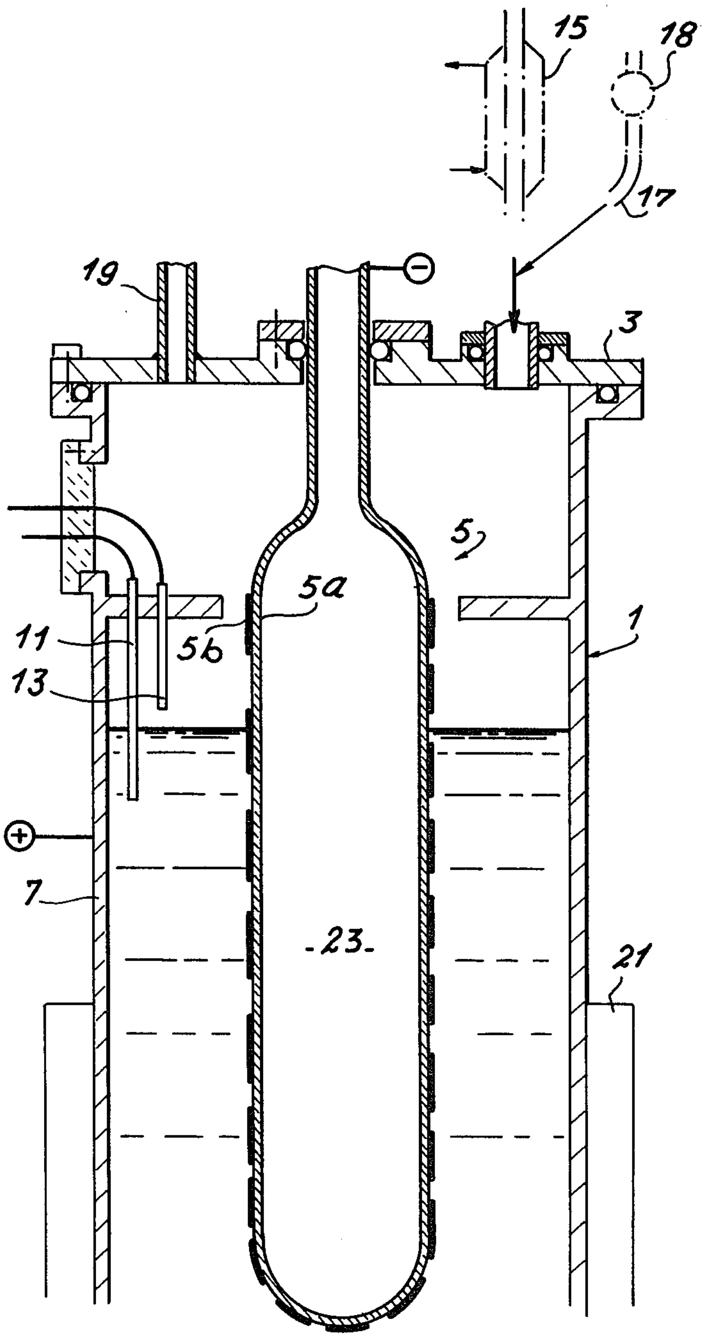
15
18
17
19
3
5
5a
5b
1
11
13
7
23
21

PROCESS FOR TREATING SOLUTIONS CONTAINING TRITIATED WATER

BACKGROUND OF THE INVENTION

The present invention relates to a process and to an apparatus for the electrolytic treatment of solutions containing tritiated water, such as effluents from irradiated nuclear fuel reprocessing plants, cooling water from light or heavy water nuclear reactors and effluents from laboratories where tritium is handled.

In irradiated nuclear fuel reprocessing installations, at certain stages of the reprocessing process, aqueous solutions are obtained which contain a large amount of tritiated water, e.g. approximately 40 $Ci/m^3$. These solutions are generally obtained during the concentration by evaporation of solutions of uranium, plutonium or fission products, or during the regeneration processing of nitric acid with a view to its recycling during the dissolving of irradiated fuel elements. In the latter case, these solutions are obtained during the concentration of nitric acid formed on regenerating, by means of water vapour or steam, the oxides of nitrogen from the destruction of the nitric acid by formol. It is also possible to envisage higher concentrations, either by recycling nitric solutions, or by isotopic concentration of the effluents.

At present, no process is known which makes it possible to ensure, under satisfactory conditions, a processing of the tritiated water with a view to recovering the tritium contained therein. Thus, the methods involving chemical reduction of the tritiated water by means of uranium in the hot state have the disadvantage of consuming uranium and leading to uranium oxide waste contaminated by tritium. Moreover, it is very difficult to handle tritiated water and numerous contamination problems are caused.

Consideration has been given to the use of an electrolytic process for treating effluents containing tritiated water from a carbon dioxide gas-cooled nuclear reactor, as described in DE-A 1,965,627 filed by Atomic Power Constructions Limited. However, according to this process, it is not possible to recover the tritium given off to the cathode with a high degree of purity, because gaseous impurities such as steam and oxygen are still contained. Moreover, this process does not make it possible to obtain good tritium yields.

BRIEF SUMMARY OF THE INVENTION

The present invention relates to a process for processing solutions containing tritiated water, which makes it possible to solve the problem of tritium recovery under satisfactory conditions.

The present invention therefore relates to a process for treating or processing a solution containing tritiated water, wherein it comprises:

(a) adding to the solution an electrolyte chosen in such a way that the solution obtained can release tritium in the gaseous state by electrolysis, (b) subjecting the thus obtained solution to electrolysis in such a way as to bring about a tritium release by working in an electrolytic cell having a metal cathode which assists tritium diffusion, said cathode forming a tight separating wall between the solution to be electrolysed and a tritium reception compartment, said cathode being coated on its surface in contact with the solution to be electrolysed with a porous palladium black deposit;

(c) and recovering in said compartment, the tritium desorbed by the cathode.

When reference is made to "tight separating wall", it is intended to mean a wall that is impervious to the solution so that there is no leak of solution to be electrolysed into the reception compartment.

According to the invention, due to the structured nature of the porous palladium black-coated cathode, it is possible to directly recover in the gaseous state and with a good yield, the tritium released during electrolysis, after it has diffused through the electrode wall and after it has been desorbed on the other face of the electrode.

Thus, the choice of a cathode made from a non-porous material, which is permeable to hydrogen and impermeable to other gases, makes it possible to obtain, following release of the tritium at the cathode, an adsorption of tritium by the cathode and then a diffusion thereof into the cathode and its desorption on the other cathode face in the reception compartment. Moreover, due to the fact that the internal pressure of the tritium on the face of the cathode in contact with the electrolyte is very high, because it varies exponentially as a function of the cathode potential, a very large difference is obtained between the internal tritium pressure on the face of the electrode in contact with the electrolyte and the internal tritium pressure on the other face of the electrode, i.e. in the reception compartment. Therefore, it is easily possible to bring about tritium diffusion into the cathode wall, even at ambient temperature, and in this way it is possible to recover the tritium in the reception compartment, even if the pressure in the latter is well above 1 bar.

However, in certain cases, a slight overpressure is established in the reception compartment, e.g. on recovering the tritium by pumping.

In a process of this type, which consists of a first stage of adsorbing tritium on the cathode wall, a second stage of diffusing tritium within the cathode and a third stage of desorbing tritium in the reception compartment, greatest importance is attached to the first stage because it determines the quantity of tritium which can be adsorbed and then diffused by the wall of the cathode in contact with the electrolyte.

According to the invention, in order to obtain a good adsorption of the tritium released by electrolysis, the surface of the cathode used which is in contact with the solution to be electrolysed is coated with a porous palladium black deposit. Thus, this deposit makes it possible to increase the specific surface of the cathode and give it a higher adsorption capacity with respect to the tritium. A second deposit on the desorption side is also favourable, but to a lesser extent.

According to the invention, it is also possible to recover the tritium in the form of solid metallic tritiide by directly reacting it in the reception compartment with a compound able to form metallic tritiide. Compounds which can be used are $La\text{-}Ni_5$ compounds, Fe-Ti compounds and alloyed or unalloyed palladium.

This makes it possible to directly store the tritium in the form of a solid compound and to perform this reaction in the reception compartment or in the vicinity thereof, which obviates the contamination problems caused by the transfer and storage of tritium in the gaseous state.

In order to improve the tritium recovery efficiency and yield, it is important to act on the following parameters:

the surface state of the cathode, i.e. the number of active centres on the adsorption and desorption faces, as well as the hydrogenation accelerators.

the structure of the metal lattice of the palladium, the temperature, the current density, which controls the kinetics of the electrochemical processes of adsorption, insertion, diffusion and desorption.

Therefore, according to the invention, in order to improve the surface of the cathode, a cathode which is covered with porous palladium black on its adsorption face and preferably also on its desorption face is used. Moreover, the presence of ferric oxide traces on the adsorption face of the cathode is favourable and the use of cathode restoration annealing also improves the results obtained.

According to the invention, the cathode is advantageously made from palladium or a palladium alloy, such as a palladium-silver alloy, because these metals have the property of adsorbing very large quantities of tritium. Preferably, the palladium-silver alloy used contains 25% silver, because the latter has a permeability which is substantially the same as that of pure palladium and the property of not deteriorating after repeated heating and hydrogenation cycles. Moreover, it is possible to use a cathode with a relatively high thickness of e.g. 250 μm, because the thickness has little influence on the permeability.

However, it is also possible to use other metals which are able to adsorb tritium, e.g. pure iron, nickel, platinum and their alloys.

The phenomenon of adsorbing tritium (T) on the cathode takes place in accordance with the following mechanism:

$$T_2O+xPd+e^- \rightarrow Pd_xT+OT^-$$

which is followed by the desorption of tritium in the metal lattice of the electrode in accordance with the mechanism:

$$Pd_xT \rightarrow xPd+T$$

In this way, the secondary reactions to be avoided are:

$$Pd_xT+T_2O+e^- \rightarrow 2T+OT^- +xPd$$

$$T_2O+e^- \rightarrow T+OT^-$$

because in this case, the tritium would be directly transferred into the electrolytic cell instead of diffusing through the wall of the electrode.

As has been shown hereinbefore, the adsorption of tritium by palladium is improved by subjecting the palladium or palladium alloy electrode to an activation treatment comprising a stage involving the coating of the electrode surface to come into contact with the solution to be electrolysed with a finely divided, porous, palladium black coating.

This activation treatment can be carried out by subjecting the electrode to an annealing heat treatment, then carrying out on the electrode surface to come into contact with the solution to be electrolysed a mechanical abrasion treatment by means of a moist ferric oxide, whereof the traces remaining on the cathode act as a hydrogenation accelerator of the palladium and the thus treated surface is then coated with finely divided, porous, palladium black.

Preferably, the porous palladum black coating is formed by the electrolysis of a palladium chloride solution in dilute hydrochloric acid. This electrolysis can be carried out with a current density of 150 mA/cm$^2$ for 4 minutes. In this way, a palladium black deposit having a thickness of 6 μm is obtained.

The annealing treatment makes it possible to increase the size of the meshes of the metal lattice of the cathode and consequently improve the diffusion of tritium into the cathode.

Palladium electrodes are generally obtained by rolling and are consequently powerfully cold rolled, hammered or hardened. The grains only appear to a limited extent and are oriented in the rolling direction. However, a recrystallization annealing is possible, because the nuclei necessary for the growth of the crystals have been produced by the cold hardening and the regions which are most disturbed and where the dislocation energy concentrates act as nuclei. On heating the metal to an appropriate temperature, the nuclei start to grow and the grain increases in size. After a certain heating time corresponding to the incubation period, recrystallization actually commences. Thus, the time and temperature play an important part and the temperature is involved in a relatively complex manner. If the temperature is not high enough during the incubation period, the number of nuclei decreases and recrystallization can be stopped, which corresponds to the restoration phenomenon. In the case of palladium electrodes, good results are obtained by carrying out annealing at a temperature of about 650° C. for 1 hour under vacuum. Thus, the hardness reduces, the mechanical stresses are reduced and the dislocations or other imperfections of the metal lattice can be displaced towards the surface of the electrode, which leads to a better diffusion of the tritium into the metal lattice of the palladium.

The mechanical abrasion treatment by means of a ferric oxide as the hydrogenation accelerator makes it possible to modify the energy necessary for passing the chemically absorbed hydrogen into hydrogen absorbed in the interstitial sites directly beneath the cathode surface. Iron occupies a certain number of sites by lending electrons to band 4*d* of the palladium. This adsorption model of the iron covering the cathode surface increases the permeability of the hydrogen in the palladium with a reduction in the potential and increase in the current. This treatment makes it possible to act on the diffused tritium quantity as a function of time.

Finally, the deposition of a thin coating of finely divided, porous, palladium black on the surface of the cathode in contact with the solution to be electrolysed makes it possible to improve the adsorption and diffusion of the tritium. Thus, the existence on the surface of a very finely divided palladium black deposit aids and multiplies the reactions occurring at the solid-solution interface to be electrolysed. Although the effect is less significant, a palladium black deposit on the desorption face improves diffusion.

According to the invention, the electrolyte added to the solution containing tritiated water is preferbly constituted by alkyl metal hydroxide, such as sodium hydroxide or potassium hydroxide, which makes it possible to prevent to the maximum possible extent the formation of complex ions resulting from radiolysis phenomena and the presence of solvated electrons due to tritium. When sodium hydroxide is used, the electrolyte concentration of this solution is advantageously 1 $mol.l^{-1}$ to 20 $mol.l^{-1}$.

Preferably, in order to further improve the diffusion of tritium in the cathode, electrolysis is carried out at a temperature above ambient temperature, e.g. at between 50 to 160° C., because in this way it is possible to improve the current density and efficiency of the cell, without there being any bubble formation on the cathode. Preferably, a temperature of 80° C. is used, because this obviates technological constraints due to the use of high temperatures and also the appearance of unfavourable phenomena, such as corrosion or secondary radiolysis reactions.

Advantageously, when the cathode is constituted by a palladium or palladium alloy wall with a thickness of 50 to 250 μm, electrolysis is carried out with a current density between 60 and 150 milliamperes/$cm^2$ and at a temperature of 80° C.

The invention also relates to an apparatus for the treatment of solutions containing tritiated water, wherein it comprises

- an electrolytic cell for containing an electrolytic solution able to release tritium in the gaseous state by electrolysis, said cell having an anode and a cathode made from a metal able to adsorb tritium, said cathode being such that it constitutes a separating wall between the solution to be electrolysed and a tritium reception compartment, said cathode being coated on its surface in contact with the solution to be electrolysed with a porous palladium black coating,
- means for establishing a potential difference between the anode and the cathode,
- means for circulating the solution containing the tritiated water and an electrolyte within the cell,
- means for recovering the oxygen given off in the cell,
- means for condensing the water vapour formed in the cell and for recycling the condensed water vapour in the solution to be electrolysed.

According to a preferred embodiment of the apparatus according to the invention, the cathode is constituted by a hollow tube, sealed at one of its ends and disposed in the cell in such a way that it is partly immersed in the electrolytic solution, the space defined within the tube constituting the tritium reception compartment.

Advantageously, the apparatus comprises means for extracting the hydrogen and/or hydrogen isotopes in the gaseous state and which have diffused into the reception compartment, said means being constituted either by a suitable pump, or by a trap based on metals and alloys such as $La\text{-}Ni_5$, Fe-Ti and alloyed or unalloyed palladium forming hydrides.

In the same way, the apparatus preferably comprises means for heating the electrolytic solution present in the cell.

As has been stated hereinbefore, the cathode is preferably made from palladium or a palladium alloy, e.g. an alloy of palladium and silver. When it is in the form of a hollow tube closed at one of its ends, the tube is externally and optionally internally covered with porous palladium black. The anode is advantageously constituted by the wall of the electrolytic cell and is made from stainless steel.

Preferably, the palladium-silver alloy tube forming the cathode undergoes an annealing heat treatment and then its outer surface is treated by mechanical abrasion by means of ferric oxide before being coated by palladium black by electrolysis.

DESCRIPTION OF THE DRAWING AND PREFERRED EMBODIMENTS

The invention is described in greater detail hereinafter relative to non-limitative embodiments and with reference to the attached drawing showing a vertical section of an apparatus for treating aqueous effluents containing tritiated water.

In the drawing, it is possible to see that the apparatus comprises an electrolytic cell 1 made e.g. from a ceramic material which is not soluble in an alkaline medium, from metal or a metallic alloy which is not corrodable, such as 316 L 22 CND 17-13 steel. Preferably, it is made from passivated stainless steel. The upper part of cell 1 is tightly sealed by a cover 3. A cathode 5 formed from a tube sealed at its lower end is placed within the cell and the cell wall forms cathode 7.

Electrically insulated current passages pass through the cell wall in order to respectively supply cathode 5 and two probes 11, 13 making it possible to ensure the control of the solution level within the cell. In its upper part, the apparatus comprises a condenser 15 and a supply pipe for the electrolytic solution 17, provided with a valve 18 controlled by an electrical relay associated with probes 11 and 13, together with an inert gas introduction pipe 19. In addition, the apparatus comprises means 21 for heating the electrolytic cell constituted by electrical resistors controlled from a thermostat responsible for the temperature control.

As can be seen in the drawing, the cathode 5 is constituted by a hollow tube *5a* having a circular cross-section with a thickness of 50 to 250 μm, which is sealed at its lower end and defines the tritium reception compartment 23 connected in its upper part to the tritium recovery apparatus. The latter must be tightly sealed in order to maintain the high purity level of the diffused tritium and it can be maintained under a vacuum by means of a primary vane pump. In general, this apparatus comprises a vacuum gauge and a monometer for controlling the vacuum, an intermediate tritium storage container, a cylinder for taking gaseous samples and a trap for storing the tritium in the form of tritiide. The vacuum can be obtained by means of a pumping system. The tube constituting cathode 5 is made from a non-porous, palladium-silver alloy, which is permeable to hydrogen and impermeable to other gases. It undergoes annealing at a temperature of 650° C. for 1 hour under a vacuum of approximately 1.35 Pa in order to remove the orientation of the grains caused by the rolling process. Following this annealing treatment, the outer surface of the tube which is to come into contact with the solution to be electrolysed undergoes a mechanical abrasion treatment using a ferric oxide powder $Fe_2O_3$ moistened with water and over a period of a few minutes, serving as the palladium hydrogenation accelerator. This is followed by the deposition on the thus treated surface of a finely divided, porous palladium black coating with a thickness of 7 μm in order to increase the active surface of the palladium in contact with the electrically discharged tritium. This deposit of finely divided, porous palladium black is carried out by the electrolysis of a palladium chloride solution containing 4 g of $PdCl_2$ dissolved in 20 $cm^3$ of 12 mol/l HCl, then diluted to 500 $cm^3$ with distilled water, whilst working under a cathode current density of 150 mA/$cm^2$, a temperature of 20° C. and for 4 minutes.

As has been shown hereinbefore, anode 7 is constituted by the wall of cell 1 and is connected to the positive pole of the current generator. Such a disposition of the anode and cathode makes it possible to obtain a good current distribution on the surface of the cathode and the formation of regular equipotential surfaces. The electrolytic current is programmed by means of a potentiostat operating in the intensiostatic mode.

In this apparatus, it is possible to treat solutions containing tritiated water in the following way. The solution to be electrolysed constituted by tritiated water containing 1 to 20 $mol.l^{-1}$ of sodium hydroxide is circlated in cell 1 by pipe 17. This tritiated water is obtained by the catalytic oxidation of tritium-containing gaseous effluents. As soon as the level of the solution in the cell detected by probes 11 and 13 reaches the desired value, the introduction of solution automatically stops. The heating device is then started up in order to raise the temperature of the solution to approximately 80° C. Argon is introduced by pipe 19 and electrodes 5 and 7 are connected to the current generator in order to electrolyse the solution with a cathode current density of 60 $mA.cm^{-2}$ and obtain a gaseous tritium release of cathode 5. The tritium is adsorbed by cathode 5 and it then diffuses within tube 5, which is normally under a vacuum by pumping. However, the process can also operate when the pressure of the gases within the tube is well above the pressure of the electrolytic cell. Under these conditions, it is possible to obtain a tritium flow rate of approximately 1 $cm.min^{-1}$. The gases released during electrolysis, i.e. oxygen, as well as tritium which has not diffused in tube 5 and also water vapour, are discharged from the cell by the argon stream towards condenser 15 in which the water vapour is condensed and then recycled within cell 1. The gases leaving the condenser are passed into a catalytic recombination system in order to re-form tritiated water, which can then be recycled within the cell.

For this purpose, the discharge pipe for the gases leaving a condenser 15 can issue into an element for the catalytic oxidation of residual tritium, said element being constituted by palladium black fixed to alumina. The tritium recombined with oxygen in the form of heavy water is then condensed in a heat exchanger and optionally recycled into cell 1. It is possible to connect a sampling funnel to the gas discharge pipe in order to analyse the extracted gases, this taking place either at the outlet from the electrolytic cell, or following the catalytic oxidation element.

Thus, the process of the invention makes it possible to obtain very pure tritium, which is in particular free from water vapour.

An apparatus of this type makes it possible to obtain satisfactory results after operating periods of about 6 weeks without any dismantling of the cathode. At the end of this time, the cathode was found to be free from defects and tritium diffused through its wall in a completely satisfactory manner. Thus, there was found to be a diffusion efficiency of 85% over a period of 330 hours, without any deterioration of the cathode permeability and without any intervention being necessary on the part of the operator.

Moreover, on comparing the results obtained with the cathode according to the invention and those obtained by using a palladium cathode which had not undergone annealing treatment, mechanical abrasion by means of a ferric oxide and deposition of porous palladium black, but having a palladium black coating on its inner surface limiting the tritium reception compartment, the superiority of the cathode which had undergone the treatment according to the invention is very obvious.

Thus, to obtain a diffusion efficiency of 83% with a cylindrical cathode of height 11 cm, diameter 2.6 cm and thickness 250 μm, made from a palladium-silver alloy treated according to the invention, electrolysis can be carried out at 160° C., under a current density of 670 $mA/cm^2$ and with the hydrogen and tritium diffusion rate under these conditions of 3.9 $cm^3.cm^{-2}.min^{-1}$.

However, on using a cylindrical palladium-silver cathode with a height of 9 cm, a diameter of 3 mm and a thickness of 100 μm, internally coated with palladium black and which has not undergone the treatments according to the invention, it is possible to obtain an efficiency of 83% by working under a current density of 454 $mA/cm^{-2}$ and with hydrogen and tritium diffusion flow rates of 2.6 $cm^3.cm^{-2}.min^{-1}$. Thus, the hydrogen and tritium flow rate is higher when using the cathode treated according to the invention.

Moreover, as a result of the special structure of the cathode according to the invention, which favours the diffusion of tritium, it is possible to treat at 160° C. solutions of tritiated water in 20N soda with an activity of 10 to 100 Ci/l.

Finally, the process and apparatus according to the invention makes it possible to solve the safety problems caused by handling tritiated water, the release of contaminated effluents, particularly with regards to the hydrogen-tritium fraction given off in the electrolytic cell, as well as problems connected with the behaviour of materials with respect to tritiated water, the radiolysis of tritiated water and the interaction with nitrogen of the air leading to corrosive compounds.

Thus, the apparatus according to the invention comprises the means necessary for isolating the cell from the surrounding atmosphere, for recovering tritium in a very pure state after diffusion in the cathode and for eliminating and recycling the water vapour, oxygen, hydrogen and tritium of a residual nature present in the gases leaving the cell, which obivates the production of new radioactive effluents.

What is claimed is:

1. A process for treating or processing a solution containing tritiated water, wherein it comprises:

(a) adding to the solution an electrolyte chosen in such a way that the solution obtained can release tritium in the gaseous state by electrolysis;

(b) subjecting the thus obtained solution to electrolysis in such a way as to bring about a tritium release by working in an electrolytic cell having a metal cathode which assists tritium diffusion, said cathode forming a separating wall between the solution to be electrolysed and a tritium reception compartment, the surface of the cathode which is in contact with the solution to be electrolysed being coated with a porous palladium black deposit;

(c) and recovering in said compartment, the tritium desorbed by the cathode.

2. A process according to claim 1, wherein the cathode is coated with a porous palladium black deposit on its desorption face.

3. A process according to claim 1, wherein the tritium is recovered in the form of metallic tritiide in the solid state by reacting the tritium with a compound able to form metallic tritiide.

4. A process according to claim 1, wherein the cathode is made from palladium or a palladium alloy.

5. A process according to claim 1, wherein as the electrolyte is of sodium hydroxide, the electrolyte concentration of the solution to be electrolysed in 1 $mol.l^{-1}$ to 20 $mol.l^{-1}$.

6. A process according to claim 1, wherein electrolysis is performed by maintaining the solution to be electrolysed at a temperature of 50° to 160° C.

7. A process according to claim 1, wherein as the cathode is made from palladium or a palladium alloy and has a thickness of 50 to 250 microns, electrolysis is carried out with a current density between 60 and 150 milliamperes/$cm^2$ at 80° C.

* * * * *